United States Patent [19]

Lofgren-Nisser

[11] Patent Number: 5,570,144
[45] Date of Patent: Oct. 29, 1996

[54] FIELD RESTRICTIVE CONTACT LENS

[76] Inventor: Gunilla Lofgren-Nisser, 25 East 67 St., #4E, New York, N.Y. 10021

[21] Appl. No.: 997,349

[22] Filed: Dec. 28, 1992

Related U.S. Application Data

[62] Division of Ser. No. 790,577, Nov. 8, 1991, abandoned.

[51] Int. Cl.⁶ ................. A61B 3/00; G02C 7/16
[52] U.S. Cl. .................. 351/247; 351/46; 351/203
[58] Field of Search ............ 351/160 R, 160 H, 351/162, 224–226, 246, 41–47, 165, 177, 219, 203; 359/726

[56] References Cited

U.S. PATENT DOCUMENTS

| | | | |
|---|---|---|---|
| 1,685,725 | 9/1928 | Rowe | 351/47 |
| 1,771,451 | 7/1930 | Suzuki et al. | 351/165 |
| 2,139,213 | 12/1938 | Verre | 351/165 |
| 3,034,403 | 5/1962 | Neefe | 351/162 |
| 3,279,878 | 10/1966 | Long | 351/161 |
| 3,431,327 | 3/1969 | Tsuetaki | 351/161 |
| 3,476,499 | 11/1969 | Wichterle | 351/162 |
| 3,507,566 | 4/1970 | Knapp | 351/165 |
| 3,603,305 | 9/1971 | Oppenheimer | 606/204.25 |
| 3,617,115 | 11/1971 | Pratt | 359/726 |
| 4,023,892 | 5/1977 | Smith | 351/45 |
| 4,976,533 | 12/1990 | Hahn et al. | 351/219 |
| 4,979,902 | 12/1990 | Morelle et al. | 351/246 |
| 5,056,909 | 10/1991 | Brown et al. | 351/177 |
| 5,094,524 | 3/1992 | Fuhr | 351/203 |
| 5,245,367 | 9/1993 | Miller et al. | 351/177 |
| 5,424,786 | 6/1995 | McCarthy | 351/46 |
| 5,440,359 | 8/1995 | Bloch-Malem | 351/203 |

FOREIGN PATENT DOCUMENTS

| | | |
|---|---|---|
| 2074870 | 10/1971 | France . |
| 5110393 | 7/1993 | WIPO . |

OTHER PUBLICATIONS

Narcissus Eye Research Foundation Brochure.
Seton Medical Center.

*Primary Examiner*—Thong Nguyen
*Attorney, Agent, or Firm*—Darby & Darby, P.C.

[57] ABSTRACT

A contact lens and method of use are disclosed where the lens has a vertical orienting mass and an occluded portion that restricts light passing through the portion. The occluded portion can be preselected to continuously restrict visual input to any portion of the retina, regardless of movement of the eye.

17 Claims, 2 Drawing Sheets

FIELD RESTRICTIVE CONTACT LENS

This is a division of application Ser. No. 07/790,557, filed Nov. 8, 1991 now abandoned.

FIELD OF THE INVENTION

This invention relates generally to a device and method useful in the diagnosis and treatment of visual and brain disorders. More specifically, the invention relates to a partially occluded contact lens.

BACKGROUND OF THE INVENTION

Weak cerebral dominance has been proposed as an important factor in reading disability. From existing evidence, it appears that information, through reading, is processed by the dominant side of the brain, that is, mostly by the left side of the brain in right-handed people and mostly by the right side of the brain in left-handed people. Many individuals with reading disabilities are left-handed. Estimates are that as many as 70% of left-handed individuals have some degrees of reading disability. This has been taken by some investigators as an indication of possible mixed dominance in brain function.

It has been suggested that individuals without a clearly dominant brain hemisphere have what may be termed crosstalk between the two hemispheres which may interfere with the efficient processing of reading material. It is thus important to be able to diagnose and treat reading disabilities that involve the improper directing of visual information to the hemispheres of the brain.

It is well established that retinal processing of visual information is almost entirely lateralized. The left half of the retinal field from the left eye and the left half of the retinal field from the right eye project to the left brain. The right half of the retinal field from the right eye and the right half of the retinal field from the left eye project to the right brain. Researchers have attempted to restrict initial input of visual information to either the right or left brain by way of glasses having lenses that are opaque in a vertical portion. While it is recognized that information crossover can occur between the hemispheres, restricting initial input to one side can cause more orderly processing of information in individuals who do not have clear lateralization of function. Unfortunately, as a subject moves his eyes, without simultaneously turning his head, the opaque portions of the glasses lenses move with respect to the subject's visual field, allowing some visual input to reach the supposedly blocked portion of the retina.

A known lens that will remain stationary with respect to the eye as the eye moves is a contact lens. Tinting of contact lenses, both for cosmetic purposes or for lessening light input to sensitive eyes is also known, although no occlusion takes place, merely lowering of the light intensity. Of course, these lenses do not completely block visual input on any part of the lens, and could not be used to selectively block input to vertical hemispheres.

Contact lenses that have automatic orientation means are known in the art as well, for example see U.S. Pat. No. 3,431,327 and U.S. Pat. No. 3,279,878. The '327 patent discloses a bifocal contact lens that is formed with a small metal weight near one edge. The weight causes the contact lens to rotate on the wearer's eye until the weight is at its lowest point, putting the horizontally-split visual field in proper perspective. The '878 patent discloses a lens that is thicker at one peripheral portion. The lens again rotates until the heavy thicker portion is at its lowest position, with the horizontally-split field properly aligned.

OBJECTS OF THE INVENTION

It is thus an object of this invention to provide an improved contact lens, capable of blocking visual input from a portion of the visual field.

It is a further object to provide an improved contact lens capable of blocking visual input to one hemisphere of the brain.

It is another object to provide a method of using the improved contact lens for diagnosis and treatment of reading disorders and other visual disfunctions relating to the hemispheres of the brain.

It is a further object to provide a method of using the improved contact lens for visual-spatial enhancement training.

SUMMARY OF THE INVENTION

In accordance with the objects of the invention, a contact lens and method of use are disclosed where the lens has a vertical orienting means and an occluded portion that restricts light passing through the portion. The occluded portion can be preselected to continuously restrict visual input to any portion of the retina, regardless of movement of the eye.

The foregoing and other objects and advantages of this invention will become apparent to those skilled in the art upon reading the detailed description of a preferred embodiment in conjunction with a review of the appended drawings.

DETAILED DESCRIPTION OF THE PREFERRED EMBODIMENTS

Figure 1:
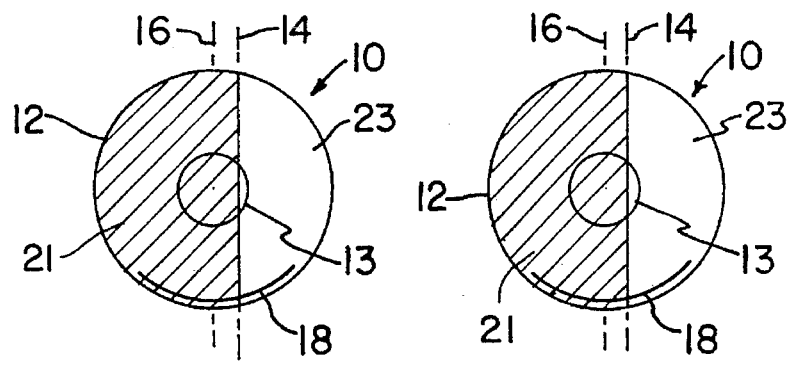
FIG. 1 shows a plan view of a pair of contact lenses according to the invention having occlusion in the right portion of the visual field.
Figure 2:
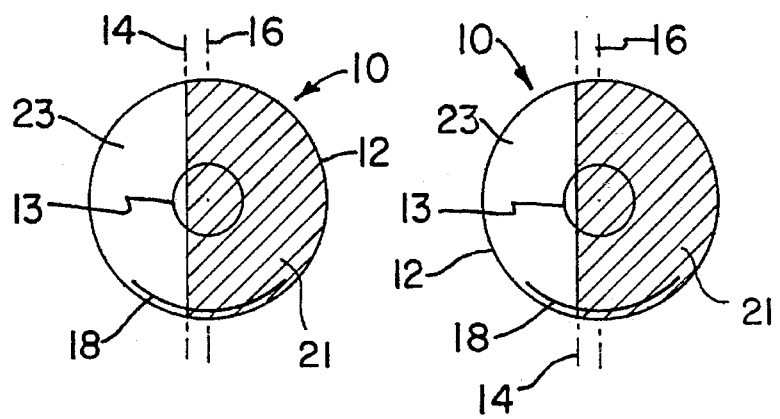
FIG. 2 shows a pair of contact lenses wherein a left portion is occluded.

Referring now to the drawings, a preferred field restrictive contact lens 10 is illustrated in FIG. 1. The lens material is preferably an acrylamide, although any known contact lens material will work similarly. Generally, a portion 12 of the lens is occluded to restrict visual input to the retina. The portion is preferably defined by a vertical separation line 14 that is offset from the vertical centerline 16 of the lens 10. The occluding method and precise positioning of the vertical separation line 14 is discussed in greater detail below. In FIGS. 1–4, the relative position of the pupil is shown by circle 13.

To maintain the vertical orientation of the occluded portion, the lens preferably includes an orienting mass 18 to maintain the orientation of the lens with respect to the eye, such as, but not limited to, those currently utilized in bifocal contact lenses. Any orienting system is suitable if it generally retains the rotational orientation of the lens 10. Preferably, the lens 10 includes a weight 18 embedded within the bottom portion of the lens 10. The weight 18 is preferably an arc-shaped piece of flexible material that does not interfere with either the visual field of the wearer or his comfort. The orienting mass can be any material denser that the lens material, or it can be an additional layer of the same lens material. With this weight 18, the lens 10 will always maintain its rotational positioning with respect to the eye so that an occluded portion of the lens always covers the same area of the eye.

On an occluded portion 12 of the lens 10, there is an impairment of the visual characteristic of the lens 10. This may be accomplished in a number of ways, including the use of dyes, the inclusion of material such as titanium in the matrix of the lens body, or the addition of other substances to the surface or the matrix of the lens 10. It is contemplated that dyes restricting certain colors more than others could be employed. The occluding material 21 is only used on the desired portion 12 of the lens; the other portion 23 remains transparent.

Figure 6:
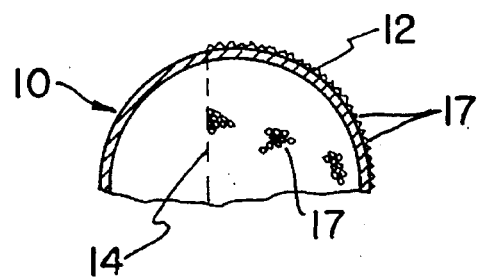
FIG. 6 is a side cross-sectional view of a contact lens according to an alternate embodiment of the invention.

Another method of producing the light restricting portion 12 is to add optical disparities 17 (see FIG. 6) to the matrix or surface of the lens 10 that distort its optical transmission in a manner to prevent focused vision in the occluded area. One example of this method is to cast small diameter (e.g. 0.5 mm) spherical convexities 17 clustered over the desired restricting portion 12. In FIG. 6, the convexities 17 are shown, exaggerated in size. While light may pass through the area created by the convexities, the random lens characteristics of the individual convexities produce randomly dispersed rays of light which reach the eye and make it impossible for the brain to distinguish any visual features, thus essentially blocking useful input to the corresponding portion of the retina.

One known method of producing the light restriction on the lens is by a proprietary "custom tinting" process of the Narcissus Foundation in Daly City, Calif. Another method involves composite lenses that are formed of hard lens material in their central portion and soft lens material in an annular skirt around the central portion. With these lenses, the central portion is easily opaqued with known dyes.

In general, the lens 10 should be a comfortably fitting corneal lens. It may also include corrective prescription properties as needed by the individual subject, or may be uncorrecting, independent of the addition of restricting properties detailed in this application. If a subject requires corrective lenses, but only uncorrecting lenses are available, the subject can wear corrective glasses in addition to the lenses of the invention. Alternatively, any objects shown to the subject during use, as described below, can be adjusted in size and position so that the subject can focus on and distinguish the objects.

Lenses have been investigated in which the pupillary area has been between 45–70% occluded. The optimal occlusion measure is near the middle of this range, but for successful screening of visual input to one hemisphere, the pupil should be occluded at least 1.5 degrees beyond the centerline 16, i.e. a slim majority of the lens should be occluded. To obtain this partial occlusion of the pupil, consider the pupil to be a circle. Place a vertical line at least 1.5 degrees to one side of the vertical centerline 16, so that the circle is divided into a larger and a smaller portion. Using a method mentioned above, the larger semicircle is occluded and made at least partially impermeable to light. In the preferred embodiment, the occluded portion 12 is considered sufficiently occluded when light provided by a 100 watt bulb at a distance of 3 feet above and in front of the subject produces a 50% reduction, as compared to a clear lens, of the brain's response, measured by a conventional indicator, such as the visual evoked potential. This assures adequate occlusion in other light conditions when the pupils may be more or less dilated. The visual evoked response is measured in a known manner, such as with an electroencephalograph (EEG).

Figure 5:
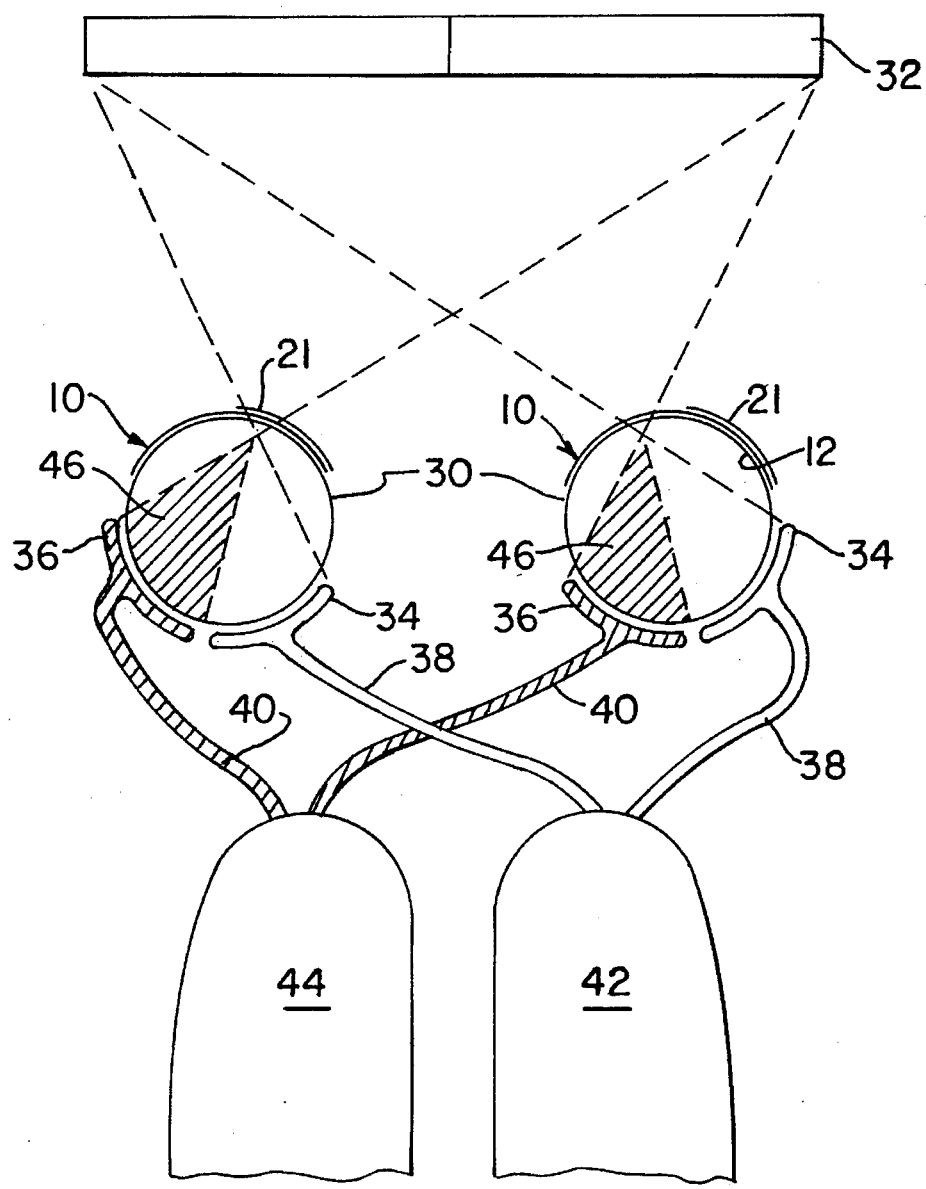
FIG. 5 is a schematic diagram showing operation of contact lenses.

In FIG. 5, an embodiment of the field restrictive contact lens according to the present invention is illustrated schematically from a top view during use by a subject. Two eyes 30 are shown with contact lenses 10 having an occluding material 21 on the surface covering the right vertical portion 12 according to the above specifications. The relative scale of this figure is exaggerated so that the occluding material 21 can be seen. In actuality, the material would be a microscopic layer, or absorbed into the lens material. The visual field, represented by the bar 32 is shown with its corresponding impact on the retinal fields 34,36 of each eye 30.

The right retinal field 34 and left retinal field 36 of each eye 30 are shown schematically with corresponding optic nerves 38,40 to transmit visual information to the right and left hemispheres 42,44 of the brain. The shaded portion 46 within each eye 30 shows the portion of the visual field 32 that is prevented from reaching the left retinal field 36 by the occluding material 21 on the contact lenses 10. In this case, the right portion of the visual field 32 is "unseen" by the left retinal fields 36. The left retinal fields 36 and nerves 40 are also shaded to illustrate that restricted or reduced visual information is being transmitted to the left hemisphere 44 of the brain. The restriction of information depends on the coverage of the occluding material, and may not always be total restriction, as it is known that the fovea of the retina can still transmit some signals to both hemispheres when other retinal portions are occluded. The right retinal fields 34 have an unimpaired view of the left portion of the visual field 32 and send appropriate nerve impulses to the right hemisphere 42 of the brain. It should be noted that a pair of contact lenses 10 having occluding material 21 on the opposite portions could be similarly used, substantially only allowing visual information to be transmitted to the left hemisphere 44 of the brain.

Figure 3:
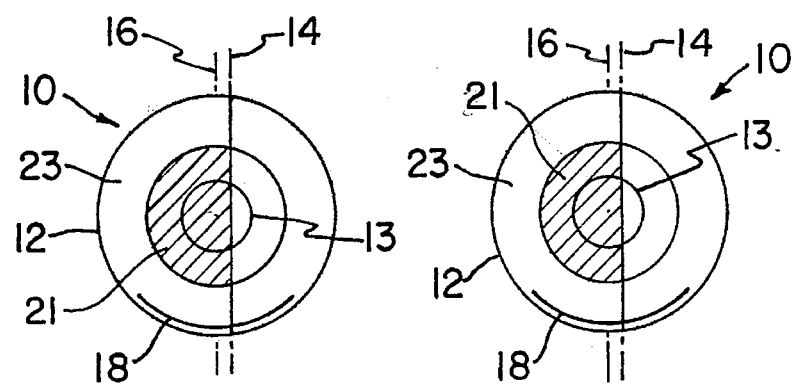
FIG. 3 shows a pair of contact lenses wherein a majority of the pupil and iris are occluded.
Figure 4:
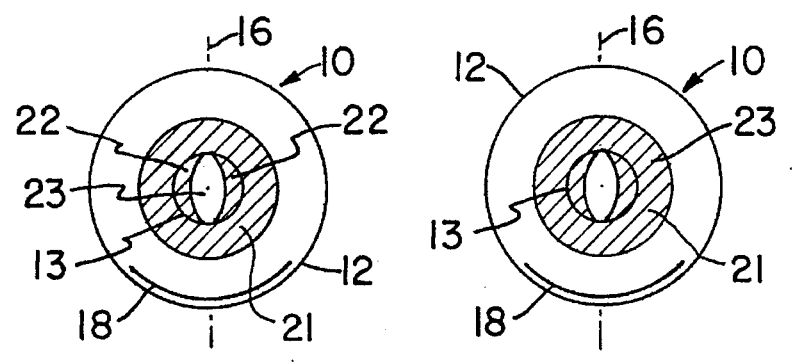
FIG. 4 shows a pair of contact lenses wherein the lateral portions of the pupil are occluded.

In an alternate embodiment of the lens, shown in FIG. 3, the occluded area 20 is only substantially over the pupil and iris area of the eye. As long as there is sufficient coverage of the pupil 13, this embodiment of the lens 10 will function similarly to the preferred embodiment of FIG. 1 and 2.

The present invention also comprises a method for diagnosis and treatment of persons with reading disabilities or visual information processing disorders. Persons wishing to receive sensory training to enhance the use of specific areas of the visual field may also advantageously use the contact lens 10 of the present invention. Some of the visual information processing disorders include, but are not limited to disabilities involving the retina, optic nerve, optic chiasm, optic tract, primary visual cortex or visual association cortex. Reading disabilities include, but are not limited to, those involving visual pattern feature discrimination and visual object recognition.

Regardless of the subject's condition, the method, described in detail below, and the lenses, allow a practitioner to determine the comparative right/left functioning of various brain pathways, such as the optic tract, thalmus, lateral geniculate, Meyer's loop, the primary visual cortex, etc.

This leads to determination, in simple terms, of the dominant hemisphere of the brain or if there is no clear dominance. In cases where the dominance is improper, the brain can be trained to direct visual input to the proper hemisphere by blocking input to the other hemisphere using the lenses of the invention.

In one preferred embodiment of the method, a subject is connected to a standard EEG electrode set to monitor the visual evoked potential (VEP) in various regions of the brain. The currently preferred system for collection and presentation of VEP is the NeuroScience Brain Imager High Performance System, which is a 32 channel EEG and evoked potentials system.

To ensure sufficient occlusion is provided by the lenses, a subject may go through a fitting period, where lenses having different percentages of occlusions are fitted in a serial fashion. For each lens, a visual test or VEP measurement is taken, until sufficient occlusion, as described above, is reached. This prevents a lens with too much or too little occlusion from being used. It should be noted that a subject should be comfortable with the lenses, as discomfort may cause distractions and interfere with accurate testing.

Once proper occlusion for the lenses is determined, the subject is tested for visual performance. This testing can include any reading or other visual test, including presenting picture or light stimuli to the subject.

The testing preferably takes place with the subject under a number of conditions. In one condition, the subject wears transparent contact lenses or no lenses. The VEP is measured to determine a baseline average. In another condition, the subject wears field restrictive contact lenses according to the invention, occluding a portion of visual input. Similar or identical visual tests are administered to the subject and VEP readings are again taken. In yet another condition, the subject wears field restrictive contact lenses having the opposite part occluded. Visual tests are administered and VEP readings are taken. It should be noted that the order of these conditions is irrelevant. It should also be noted that the visual stimulus should be chosen based on the disorder under study. Examples of stimuli are grids of alternating black and white squares or colored patterns.

It is contemplated that one eye could be tested independently. In this case, the untested eye would be fully occluded. Full occlusion can be accomplished easily, for example, by closing the untested eye, covering it with an eye patch, or with a contact lens similar to the present invention, except the occluded portion covers approximately the entire lens.

Resultant VEP data can be compared between the various test conditions to determine which is the dominant hemisphere of the brain or if a mixed dominance situation exists. As a non-limiting example, it could be determined that a stimulus that would normally be recognized by an area in the left hemisphere of a supposedly left-dominant subject causes similar changes in the VEP of both hemispheres, showing a mixed dominance. In this case, a training program could begin, using the field restrictive contact lenses to block visual input to the right hemisphere so that the left hemisphere would adapt to function more independently of the right.

Experimental data has shown that using the method of the present invention makes it possible to monitor the primary, secondary, and polysensory areas of the brain cortex and make high resolution comparisons between the hemispheres in visual information processing. Particular areas that have been monitored in experiments include those shown to be aberrant in development in primary dyslexia and in individuals with multiple learning disabilities or those having endogenous vascular failure affecting the left hemisphere optic radiations (Meyer's loop) that relay visual information within the brain.

Any training method that involves the selective obstruction of a portion of the visual field is contemplated by the present invention. For non-limiting example, there could be military applications where it is desirable to train a subject to be more attentive to a certain portion of their field of view, such as a portion of a cockpit instrument panel. Lenses such as those shown in FIG. 4, would allow the subject to see objects in the center of his field of view, essentially blocking his peripheral vision. This is accomplished by creating two occluded portions 22 on the lateral edges of the visual field. This could enhance focused vision or help eliminate distractions in the periphery. Conversely, if only the center of the pupil 13 were blocked, the subject could receive training in enhancing awareness of the peripheral vision.

Thus, it can be seen that the lens of the present invention can effectively block or restrict visual input to a selected area of the retina and thus, the brain. The lens can also be used for diagnosis and treatment of various disorders by accurately, completely, and selectively blocking visual input to a portion of the retina and the brain, regardless of eye movement or movement of the objects.

While the embodiment of the invention shown and described is fully capable of achieving the results desired, it is to be understood that this embodiment has been shown and described for purposes of illustration only and not for purposes of limitation.

What is claimed is:

1. A method for determining functioning of visual brain pathways of the right and left brain hemispheres of a human subject by diagnosing electrical response of the brain hemispheres to visual input stimuli comprising the steps of:

a) placing in one eye of the subject a field restrictive contact lens having a portion that occludes visual input stimuli to a selected part of the one eye and that maintains its position relative to the one eye as it moves so as to transmit visual information to substantially only a selected one of the two brain hemispheres of the subject and that substantially reduces the input of visual information to the other of the two brain hemispheres;

b) subjecting the one eye of the subject having the contact lens to visual input stimuli; and c) performance testing the electrical response of at least the subject's other brain hemisphere in response to the visual input stimuli to the one eye.

2. A method according to claim 1, further comprising the steps of:

d) also performance testing the electrical response of both of the brain hemispheres of the subject with the one eye essentially unoccluded to the visual input stimuli; and e) comparing the results from said performance testing of step d) with the performance testing of step C).

3. A method according to claim 1, further comprising the steps of:

$d^1$) substantially fully occluding the other eye of the subject to visual input stimuli; and, $e^1$) performance testing the electrical response of at least the subject's other brain hemisphere in response to visual input stimuli.

4. A method as in claim 3 further comprising the step of comparing the performance testings of steps c) and $e^1$.

5. A method as in claim 1, further comprising the step of:

removing said contact lens placed in the one eye in step a);

placing in the one eye a said field restrictive contact lens that occludes visual input stimuli to a selected part of the one eye so as to transmit visual information to the other of the hemispheres of the brain of the subject and that substantially reduces the input of visual information to said one brain hemisphere; and performance testing the electrical response of at least the other brain hemisphere in response to visual input stimuli.

6. The method of claim 1 further comprising the steps of:

substantially reducing visual input stimuli to substantially only the one of the two hemispheres of the subject's brain by using in the one eye of the subject said visual field restrictive contact lens having a different occluding portion; and performance testing the electrical response of the subject's one brain hemisphere in response to visual input stimuli.

7. A method as in claim 1, wherein said electrical performance testing is an evoked visual response test.

8. A method for comparing functioning of visual brain pathways of the right and left brain hemispheres of a human subject by diagnosing electrical response of the brain hemispheres to visual input stimuli, comprising the steps of:

a) placing in one eye of the subject a field restrictive contact lens having a portion that occludes visual input stimuli to a selected part of the one eye and that maintains its position relative to the one eye as it moves so as to transmit from the one eye in response to visual input stimuli visual information to substantially only a selected one of the two brain hemispheres and that substantially reduces the input of visual information to the other of the two brain hemispheres;

b) subjecting the one eye of the subject to visual input stimuli;

c) performance testing the electrical response of at least the other brain hemisphere of the subject d) removing said lens;

e) placing in the one eye said field restrictive contact lens that occludes visual input stimuli to the one eye so as to transmit visual information input to the other of the brain hemispheres of the subject and that substantially reduces input of visual information to the one brain hemisphere; and f) performance testing the electrical response of at least the other brain hemisphere of said subject in response to visual input stimuli to the one eye.

9. The method of claim 8 comprising the additional step of determining from both of said performance testings of steps c) and f) a primary brain side and a secondary brain side.

10. The method of claim 8 further comprising the step of fully occluding the other eye while performing the performance testing.

11. A method for treating visual performance mixed-dominance brain hemisphere response in a human subject in response to visual input stimuli comprising the steps of:

a) placing in each of the eyes of the subject a field restrictive contact lens having a portion that occludes visual input stimuli to a selected portion of the eye and that maintains its position relative to the eye as the eye moves so as to transmit visual information from each eye to substantially only a selected one of the two brain hemispheres of the subject and that substantially reduces input of visual information to the other brain hemisphere; and b) subjecting both eyes of the subject to visual input stimuli.

12. The method of claim 11 wherein said field restrictive contact lens comprises an orienting means providing said lens generally stable orientation within an eye as it moves, and a respective portion to each of the left and right of a substantially vertical line with the lens being in the eye of the subject, one such portion not impairing transmission of visual input stimuli to the eye and the other such portion occluding the passage of the visual input stimuli.

13. A method for comparing functioning of visual brain pathways of the left and right brain hemispheres of a human subject by diagnosing brain hemisphere electrical performance in response to visual input stimuli comprising the steps of:

a) placing in each of the eyes of the subject a field restrictive contact lens having a portion that occludes visual input stimuli to a selected portion of the eye and that maintains its position relative to the eye as the eye moves so as to transmit visual information to substantially only the same selected one of the two brain hemispheres and that substantially reduces input of visual information to the other of the two hemispheres of the subject's brain;

b) subjecting both of the eyes of the subject to visual input stimuli; and c) electrically performance testing the at least the other hemisphere of the subject's brain in response to the visual input stimuli to both eyes.

14. A method as in claim 13 further comprising the steps of:

d) placing in each of the eyes of the subject a said field restrictive contact lens that occludes visual input stimuli to a part of each eye so as to transmit visual information input to substantially only the other of the hemispheres of the brain of the subject and that substantially reduces the input of visual information to the one brain hemisphere; and e) electrically performance testing at least the other hemisphere in response to visual stimuli to both eyes.

15. A method as in claim 14 further comprising the step of:

d") further electrically performance testing, without a visual field restrictive contact lens in either of the eyes of a subject, both hemispheres of the subject's brain in response to visual input stimuli; and e") comparing the results of the performance testings of steps e) and d").

16. A method as in claim 14 further comprising the step of comparing the performance testings of steps c) and e).

17. A method as in claim 13 further comprising the step of:

d$^1$) electrically performance testing, without a visual field restrictive contact lens in either of the eyes of the subject, both hemispheres of the subject's brain in response to visual input stimuli; and e$^1$) comparing the results of the performance testings of steps c) and d$^1$.

* * * * *